Patented Mar. 12, 1929.

1,704,981

UNITED STATES PATENT OFFICE.

PAUL FRANÇOIS JOSEPH LEBRUN, OF PARIS, FRANCE.

METHOD OF PREPARING LUMINESCENT TUBES.

No Drawing.   Application filed August 26, 1927. Serial No. 215,751.

This invention relates to a method of preparing luminescent tubes, and the objects of the invention are to eliminate as far as possible occluded gases and impurities from the interior surface of the tube, prior to the permanent filling thereof with the luminescent gas, and it consists essentially in the treatment of the tube with a conducting vapour such as ethyl alcohol or methyl alcohol from which a high tension current is passed in the manner hereinafter more fully set forth and described.

In manufacturing luminescent tube, according to the present invention, the electrodes themselves are preferably first given a scavenging treatment of a heated gas before insertion in the tube. This may be done by heating electrodes in a suitable container filled with a scavenging gas, such as nitrogen or a mixture of nitrogen and hydrogen, to a temperature of from 700 to 800° C., for a period of from 15 to 20 minutes. The electrodes are then placed in a bulb, which is to be welded to the luminescent tube, but before welding takes place a few drops of a liquid, such as ethyl alcohol or methyl alcohol designed to produce a conducting vapour, are introduced into the bulb. The bulb is then sealed by welding to the tube, and a preliminary incomplete vacuum is made, by exhausting with a suitable vacuum pump, thereby producing in the tube, a rarified mixture of gaseous ethyl alcohol or methyl alcohol and air. This incomplete vacuum may be in the neighborhood of .007–.005 mm. of mercury.

A high tension current of the order of 10.000 volts is then passed through this gaseous mixture for a short period of time say from 5 to 6 minutes. The vacuum pump is then connected to the tube, and the vacuum treated as far as possible, say to .0001 mm. of mercury. The tube is then filled with the luminescent gas, such as neon, which is to constitute the final filling.

As many changes could be made in the above construction, and many apparently widely different embodiments of my invention, within the scope of the claims, constructed without departing from the spirit or scope thereof, it is intended that all matter contained in the accompanying specification shall be interpreted as illustrative and not in a limiting sense.

What I claim as my invention is:

1. In the manufacture of luminescent tubes, the herein described method of treating a tube, prior to filling thereof with luminescent gas, which is to constitute its final filling, which comprises forming a rarified mixture of air and a conducting alcoholic vapour in the tube, and passing the high tension current therethrough.

2. The method as claimed in claim 1, in which the vapour is formed from ethyl-alcohol.

3. The method as claimed in claim 1, in which the high tension current is of the order of 10.000 volts.

4. A luminescent tube prepared according to the method claimed in claim 1, in which the electrodes are given a preliminary scavenging treatment by heating the same in the presence of a scavenging gas prior to insertion in the tube.

5. The method as claimed in claim 1, in which the vapour is formed by adding a few drops of ethyl-alcohol to the bulbs, and cleaning the electrodes prior to connecting the bulbs to the tube.

In witness whereof I have hereunto set my hand.

PAUL FRANÇOIS JOSEPH LEBRUN.